US011473664B2

(12) United States Patent
Capoldi et al.

(10) Patent No.: US 11,473,664 B2
(45) Date of Patent: Oct. 18, 2022

(54) GEAR TOOTH CHAMFER FOR AN ANNULAR GEAR

(71) Applicant: AKTIEBOLAGET SKF, Gothenburg (SE)

(72) Inventors: Bruno Capoldi, Charentenay (FR); Siegfried Derrer, Höchstadt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 452 days.

(21) Appl. No.: 16/658,345

(22) Filed: Oct. 21, 2019

(65) Prior Publication Data

US 2021/0116010 A1    Apr. 22, 2021

(51) Int. Cl.
*F16H 55/08*     (2006.01)
*F16C 19/00*     (2006.01)

(52) U.S. Cl.
CPC ........... *F16H 55/088* (2013.01); *F16C 19/00* (2013.01); *F16H 2055/0866* (2013.01)

(58) Field of Classification Search
CPC ................. F16H 55/08; F16H 55/088; F16H 2055/0866; F16C 19/00; B66C 23/84
USPC ............................................. 74/462; 212/247
See application file for complete search history.

(56) References Cited

U.S. PATENT DOCUMENTS

| 4,942,781 A * | 7/1990 | Hori | F16H 55/0806 74/462 |
|---|---|---|---|
| 7,513,761 B2 * | 4/2009 | Lindgren | F04C 29/0042 418/201.3 |
| 8,061,229 B2 * | 11/2011 | Zhuravlev | F16H 55/08 74/462 |
| 2006/0135304 A1 * | 6/2006 | Sonoda | F16H 55/08 474/152 |
| 2009/0165585 A1 * | 7/2009 | Zhuravlev | F16H 55/08 74/462 |
| 2017/0355406 A1 * | 12/2017 | Mizusawa | F16H 55/17 |

* cited by examiner

*Primary Examiner* — Joseph Brown
(74) *Attorney, Agent, or Firm* — J-Tek Law PLLC; Scott T. Wakeman; Mark A. Ussai

(57) ABSTRACT

A bearing including a bearing ring having an annular base and a plurality of gear teeth integrally formed with the annular base. Each gear tooth of the plurality of gear teeth includes a first flank surface extending substantially radially from the annular base, a top land surface extending substantially in the axial direction, and a chamfered surface between the top land surface and first flank surface. The chamfered surface includes a first arc with a first radius in a range of 0.1 to 0.15 times the gear module of the bearing ring. The first arc has a point of tangency with the first flank surface. The chamfered surface has length P extending in the radial direction between the point of tangency and the top land surface, and P is in the range of 0.1 to 0.15 times the gear module of the bearing ring.

15 Claims, 8 Drawing Sheets

GEAR TOOTH CHAMFER FOR AN ANNULAR GEAR

BACKGROUND OF THE INVENTION

The present invention relates to an improved gear tooth for an annular gear (i.e. slewing gear) and the method of making the same. More particularly, the gear tooth includes chamfered or beveled surfaces with an arc surface adjacent the side or flank surface of the gear tooth, and an angular edge between the chamfered surfaces and top land surface of the gear tooth. These features of the chamfered surface allow the annular gear to mesh and rotate with a pinion with reduced and/or little to no damage to the gear teeth of the pinion.

Conventional gear teeth of annular gears have chamfered surfaces with angular edges between the flank surface of the gear tooth and the top land surface of the gear tooth. As shown in FIG. 1, the chamfered surfaces 1, 2 on gear tooth 6 of the annular gear 4 cause wear damage 3 on the pinion 5. The damage 3 may occur at the point that angular edge 1*a* of chamfered surface 1 hits pinion 5 during gear 4 rotation.

BRIEF SUMMARY OF THE INVENTION

This invention eliminates the negative issues associated with the angular edges of chamfered surfaces of gear teeth. More specifically, the preferred embodiment of the invention incorporates a chamfered surface on the gear tooth having an arc surface adjacent to the side flank surface of the gear tooth and an angular edge at the boundary of the chamfered surface and top land surface of the gear tooth. As a result, an annular gear can mesh with and rotate with a pinion without causing damage to the pinion teeth and/or with relatively much less damage.

One embodiment of the invention is a bearing comprising a bearing ring including an annular base and a gear module, m; a plurality of gear teeth connected to the annular base and the plurality of gear teeth positioned circumferentially around the annular base; and each gear tooth of the plurality of gear teeth including a first flank surface extending from the annular base, a top land surface extending from the first flank surface, and a second surface between the top land surface and first flank surface, the second surface including a first arc surface with a first radius $\geq 0.1m$ and $\leq 0.15m$. Additionally, the bearing may comprise the first flank surface being tangent to the first arc surface and defining a point of tangency.

In another aspect of the invention, a length P extends between the point of tangency and an outside line, which is coplanar with the top land surface, and the length P is $\geq 0.1m$ and $\leq 0.15m$. Also, the length P, as measured perpendicular to the outside line to the point of tangency, may be $\geq 0.1m$ and $\leq 0.15m$.

In another aspect of the invention, each gear tooth of the plurality of gear teeth further comprises an angular edge between the second surface and the top land surface, and the first arc of the second surface is contiguous with the first flank surface. Further, there may be a substantially 135-degree angle between the second surface and the top land surface. Additionally, each gear tooth of the plurality of gear teeth may include a third surface between the second surface and the top land surface, and the third surface is substantially linear.

Additional aspects of the invention may include a second flank surface extending from the annular base, and a fourth surface between the second flank surface and top land surface, wherein the fourth surface includes a second arc with a second radius substantially equal to the first radius.

Additionally, the first flank surface may extend in a substantially radial direction from the annular base and the top land surface may extend in a substantially axial direction.

Another embodiment of the invention is a gear tooth for a bearing including an annular ring with an annular base and a gear module, m. The gear tooth comprises a first flank surface contiguous with the annular base and extending from the annular base; a second surface contiguous with the first flank surface and extending from the first flank surface; a first arc surface formed in the second surface and the first flank surface is tangent to the first arc surface at a point of tangency; a top land surface contiguous with the second surface and extending from the second surface; and a length P extending from the point of tangency to a line coplanar with the top land surface and the length P is $\geq 0.1m$ and $\leq 0.15m$. Also, the length P, as measured perpendicular to the outside line to the point of tangency, may be $\geq 0.1m$ and $\leq 0.15m$ In other aspects of the invention, the first arc surface includes a first radius R $\geq 0.1m$ and $\leq 0.15m$. Also, the top land surface and the second surface abut and form an angular edge. Further, the invention may include a substantially 135-degree angle between the second surface and the top land surface.

In another aspect of the invention, the gear tooth may also comprise a second flank surface extending from the annular bearing; a third surface contiguous with the second first flank surface and the top land surface; and a second arc surface formed in the third surface. Further, the second arc surface may comprise a second radius substantially equal to the first radius.

In yet another aspect of the invention, the first flank surface extends substantially radially from the annular base and the top land surface extends substantially axially from the second surface.

Another embodiment of the invention is method of making an annular gear including at least one gear tooth with a chamfered surface. The method comprises the steps of providing the annular gear having an annular base with the at least one gear tooth extending substantially radially from the annular base, the at least one gear tooth includes a first flank surface extending substantially radially from the annular base and a top land surface extending in a substantially axial direction; determining the gear module, m, of the annular gear; and chamfering the at least one gear tooth so that a first chamfered surface is formed between the first flank surface and the top land surface and the first chamfered surface includes a first arc surface with a radius R having a length in a range of values $\geq 0.1m$ and $\leq 0.15m$.

The step of chamfering the at least one gear tooth may further comprise forming the first chamfered surface so that the first flank surface is tangent to the first arc surface at a point of tangency. Also, the step of chamfering the at least one gear tooth may further comprise forming the first chamfered surface with a distance P, as measured between the point of tangency and perpendicular to a line coplanar with the top land surface, in the range of values $\geq 0.1m$ and $\leq 0.15m$.

Another aspect of the invention comprises the steps of providing a pinion configured to be used with the annular gear; and selecting the radius R from the range of values $\geq 0.1m$ and $\leq 0.15m$ so that the annular gear is configured to mesh with the pinion.

Another aspect of the invention comprising the steps of providing a pinion configured to be used with the annular gear; and selecting the distance P from the range of values ≥0.1m and ≤0.15m so that the annular gear is configured to mesh with the pinion.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1:
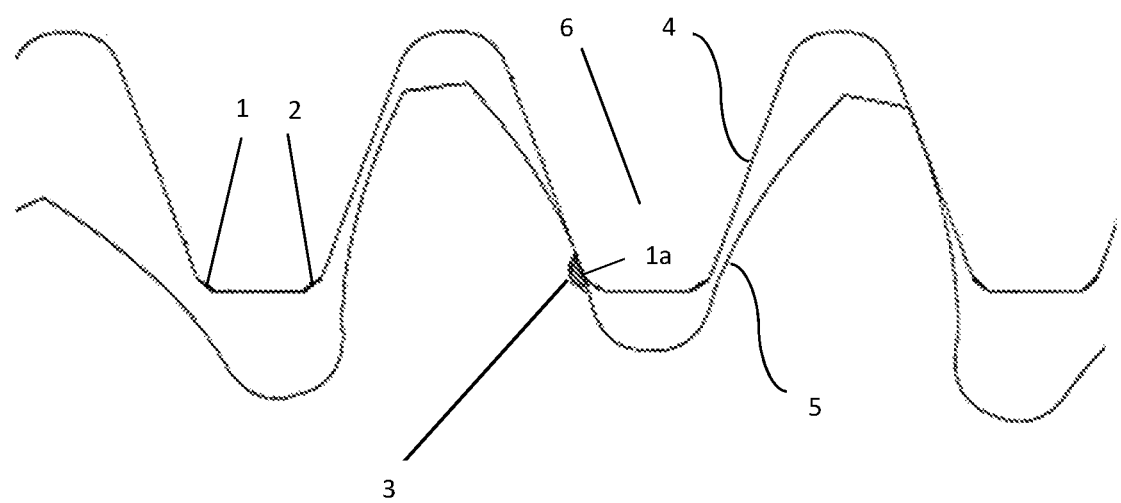
FIG. 1 an exemplary view of a prior art gear teeth meshing with a pinion.
Figure 2:
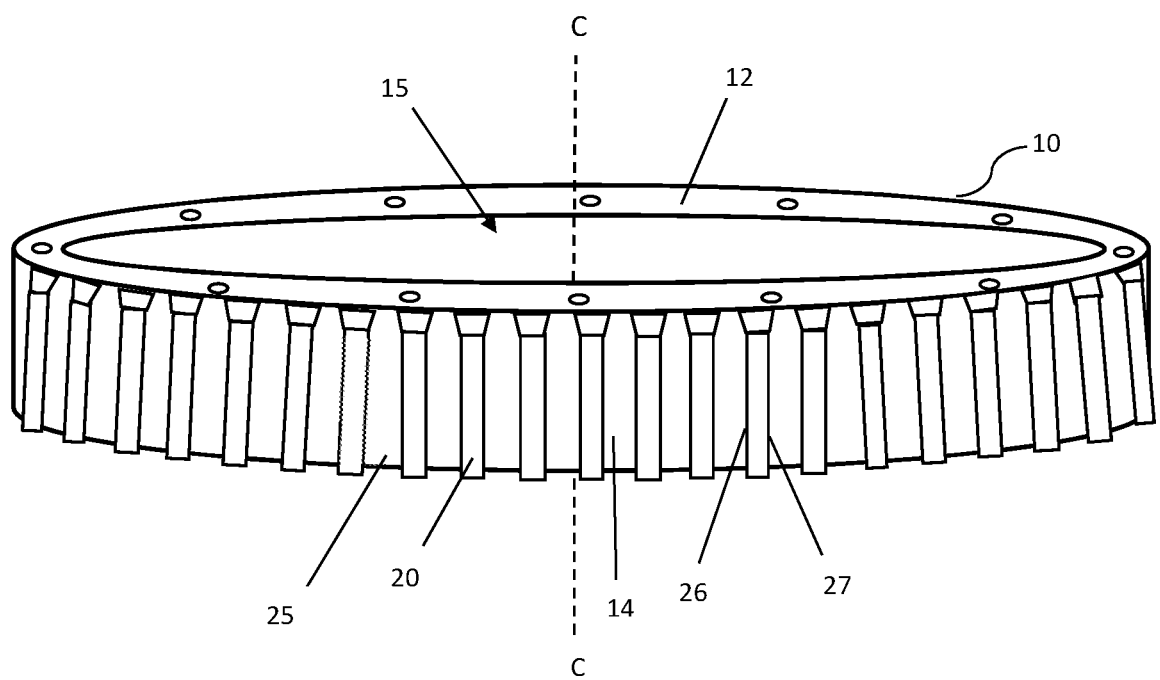
FIG. 2 depicts an annular bearing according to a preferred embodiment of the invention.

Referring now to the drawings in detail, wherein like numbers are used to indicate like elements throughout, there is shown in FIG. 2, a preferred embodiment of an annular bearing 10 such as a slew bearing. The bearing 10, in this embodiment, basically comprises an annular ring 14 surrounding a central opening or bore 15 and a central axis C. The annular ring 14, also, comprises an annular base 12 and outwardly, radially extending gear teeth 20 separated by areas 25 of the annular base 12. The gear teeth have chamfered surfaces 26 and 27.

In this embodiment, the gear teeth 20 are formed integral with the annular base 12. It is also contemplated that gear teeth 20 may be connected to the annular base 12 by other methods such as welding. Additionally, other configurations of the positioning of the gear teeth 20 relative to the central axis C are contemplated. For example, the gear teeth 20 may extend axially or in the axial and radial directions. Also, the gear teeth 20 may extend radially inward, as shown in FIG. 3, rather than radially outward, as shown in FIG. 2.

Figure 3:
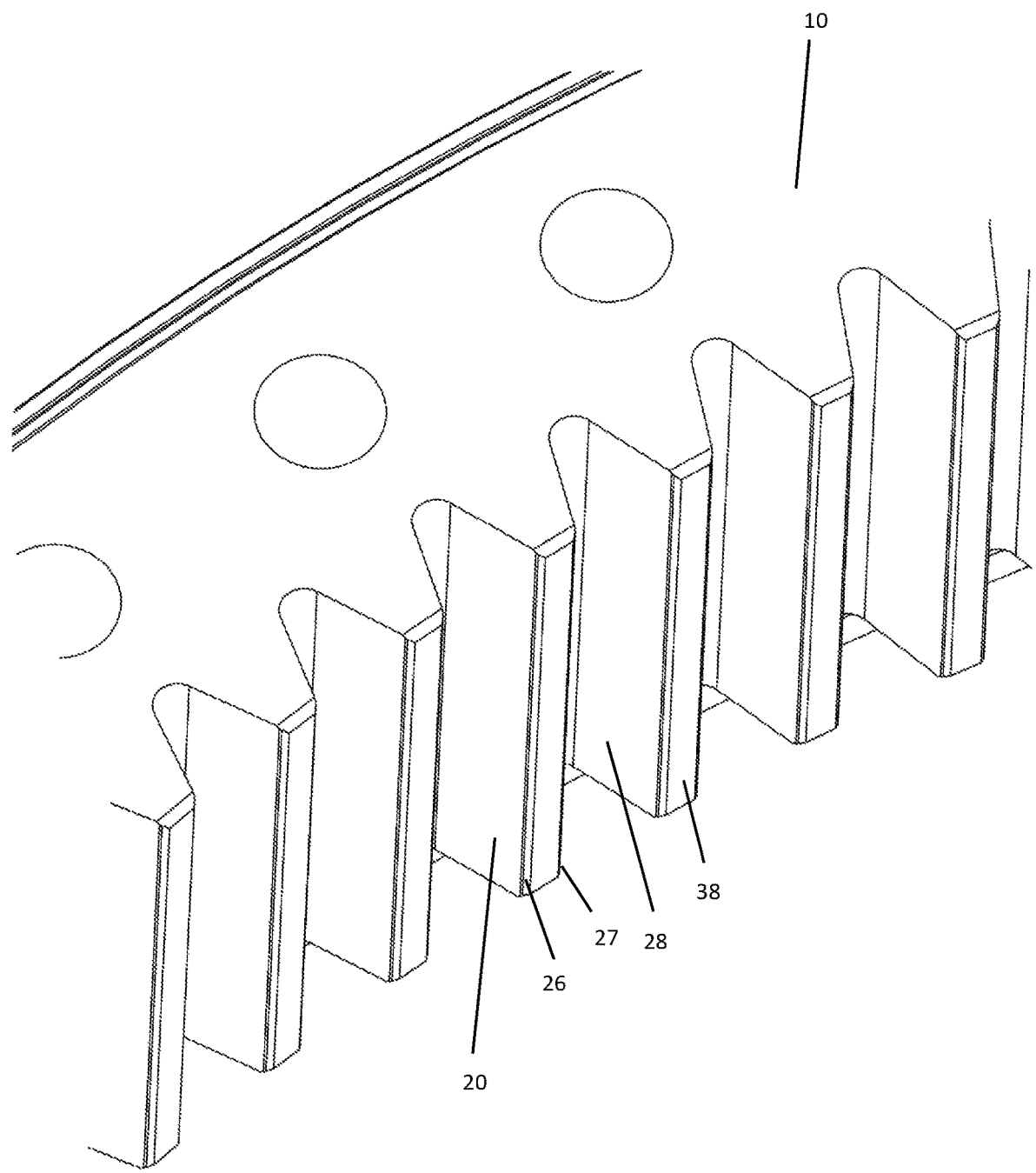
FIG. 3 depicts and exploded view of the gear teeth of an annular bearing according to the preferred embodiment of the invention.
Figure 4:
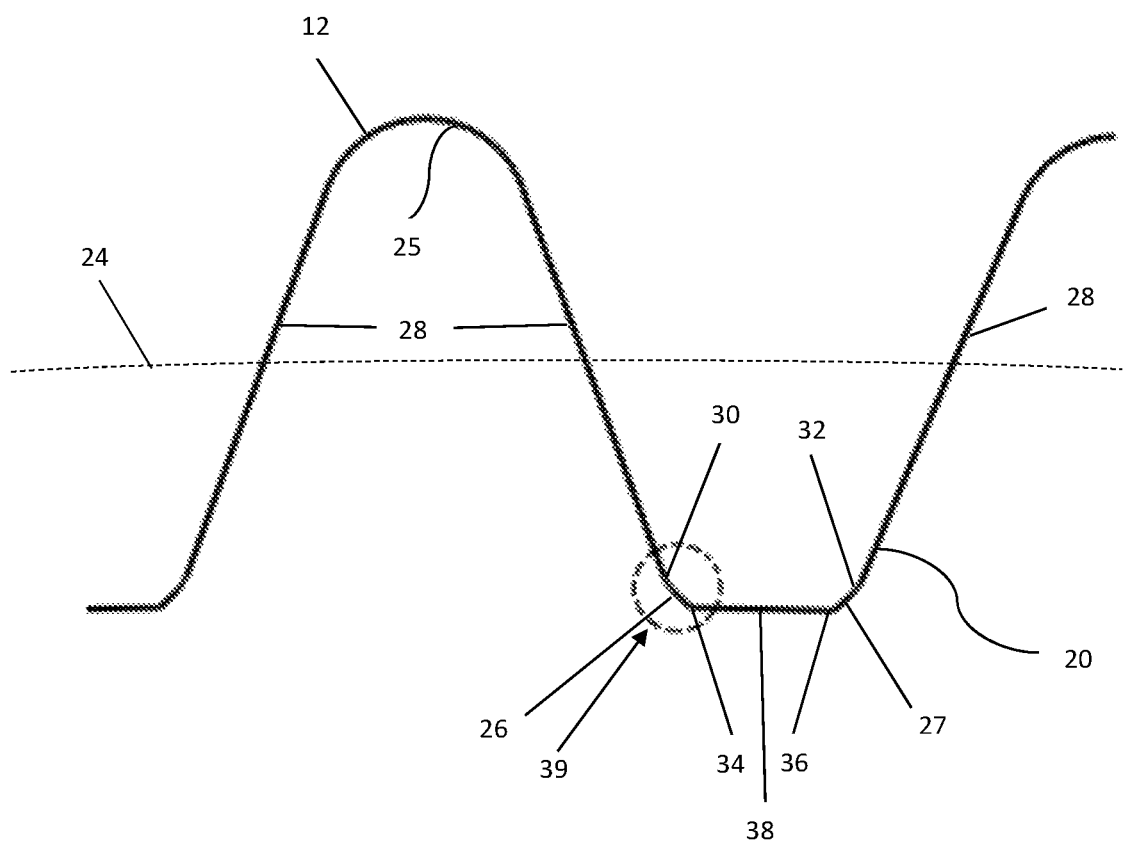
FIG. 4 depicts the gear teeth profile and/or cross-sectional view of the gear teeth in FIG. 3.

FIG. 3 depicts an exploded view of gear teeth 20. As shown, chamfered surfaces 26 and 27, side flank surfaces 28 and top land surfaces 38 extend essentially through the entire width of the gear 10. FIG. 4. depicts a cross-sectional view or gear teeth 20 profile according to the preferred embodiment of the invention. Each gear tooth 20 has two flank surfaces 28 which form the sides of the gear teeth and extend radially outwardly from the annular base 12 towards a top land surface 38. The top land surface 38 is the surface on the apex of the gear teeth 20 and extends substantially axially between the two flank surfaces 28. Although the top land surface 38 is shown as a generally flat surface, it may have other configurations such as curved surface or area. As shown in FIG. 4. the side flank surfaces 28 are formed contiguous with the annular base and the chamfered surfaces 26, 27. Additionally, the top land surface 38 is formed contiguous with chamfered surfaces 26, 27.

Chamfered or beveled surfaces 26, 27 extend between each flank surface 28 and top land surface 38, and the chamfered surfaces 26, 27 are formed differently adjacent the top land surface 38 and flank surfaces 28. More specifically, the chamfered surfaces 26, 27 have arc shaped or rounded surfaces 30, 32 adjacent to and contiguous with flank surfaces 28. On the other hand, junctions between the chamfered surfaces 26, 27, respectively, and either end of the top land surface 38 are angular and form edges 34, 36. FIG. 4 also illustrates the pitch circle 24 of the gear with a dashed line that extends through the middle of the gear teeth 20.

Figure 5A:
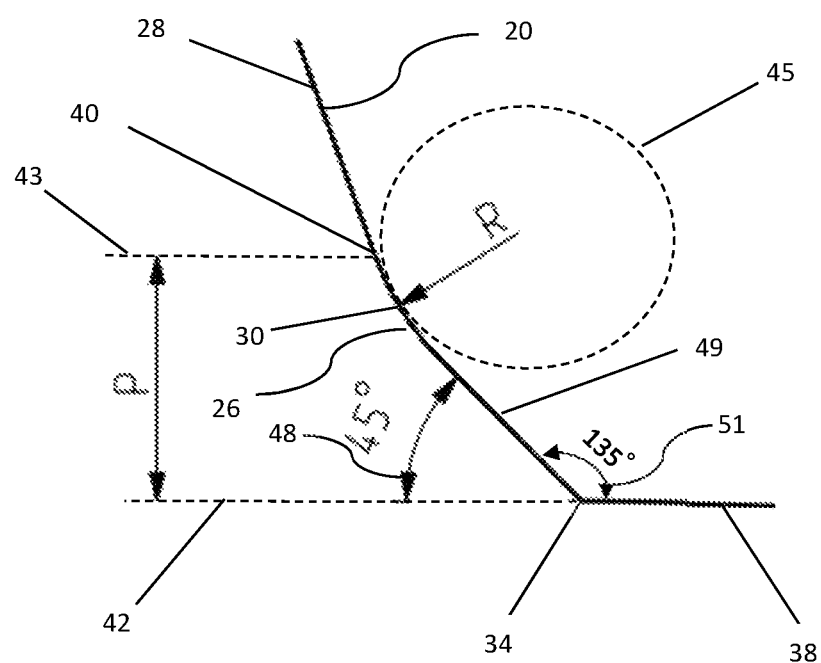
FIG. 5A depicts an exploded view of the chamfered surface shown in FIG. 4.

The dashed circle 39 in FIG. 4 denotes an area of the gear tooth 20 containing the chamfered surface 26. FIG. 5A is an enlarged view of the area within dashed circle 39, and even though circle 39 is shown surrounding the chamfered surface 26, chamfered surface 27 is similarly formed. As shown, arc surface 30 has a radius R and is a circumferential portion or arc of a circle 45 shown by the dashed circle 45 having a radius R. The chamfered surface 26 may have a generally linear surface 49 between the arc surface 30 and top land surface 38. Edge 34 is formed at the intersection of the linear surface 49 with top land surface 38 so that linear surface 49 of the chamfered surface 26 extends radially inwardly at a substantially 45-degree angle 48 from the outside line and top land surface 38, and there is a substantially 135-degree angle 51 between the linear surface 49 and the top land surface 38.

The arc surface 30 and side flank surface 28 are contiguous and are formed so the side flank surface 28 is tangent to the arc surface 30. Both the arc surface 30 and side flank surface 28 meet at a point of tangency 40.

In addition to the representation of the circle 45 with a dashed line, FIG. 5A includes dashed outside line 42 and boundary line 43 which are separated by a length or distance P extending in the radial direction. Outside line 42 extends in the axial direction, relative to axis C, and is co-planar with top land surface 38. The boundary line 43 extends in an axial direction, relative to axis C, is substantially parallel to the outside line 42 and intersects flank surface 28 at the point of the tangency 40 of arc surface 30 and flank surface 28. The length or distance P represents the distance between the point of tangency and the top land surface, and P is measured from the point of tangency or a point on the boundary line 43 to a point on the outside line 42 so that P is substantially perpendicular to the outside line.

Figure 5B:
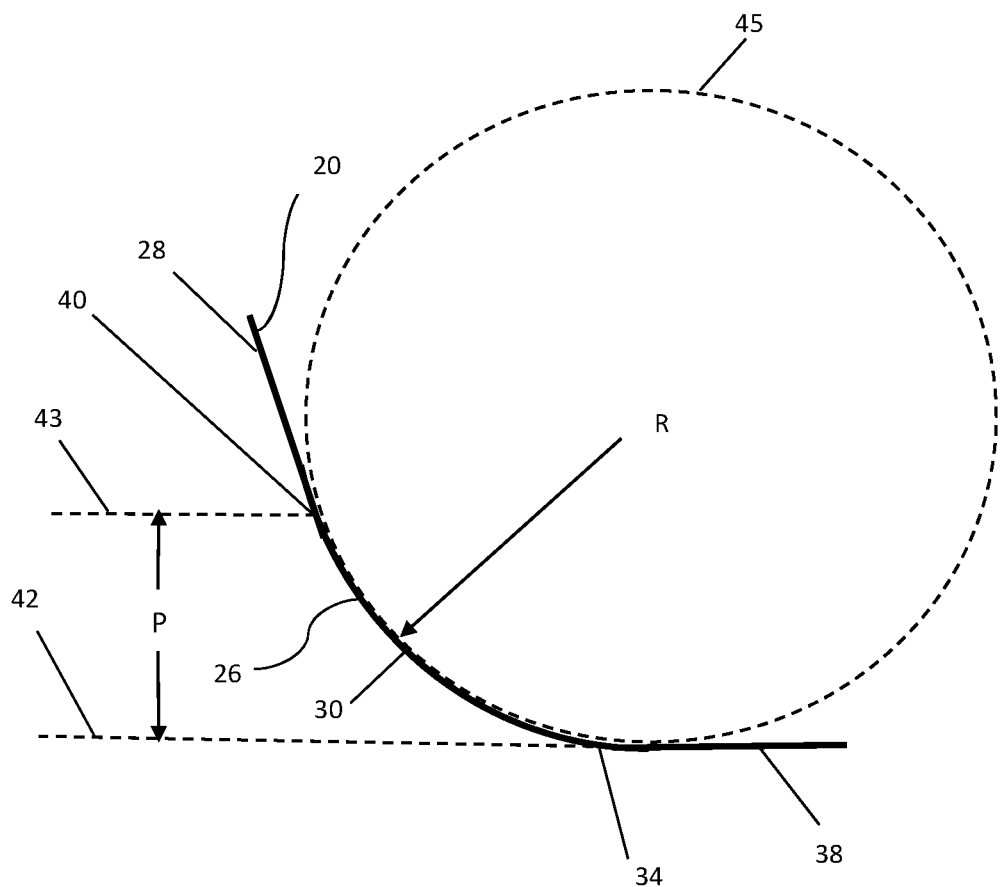
FIG. 5B depicts an exploded view of an alternate embodiment of the chamfered surface shown in FIG. 4.

FIG. 5B depicts an alternate embodiment of the enlarged view of the area within dashed circle 39. As shown, surface 26 may be formed without the linear surface 49 and the arc surface 30 may be directly connected to the top land surface 38 and the flank surface 28. In this embodiment, the boundary 34 between the arc surface 30 and the top land surface may be generally rounded rather than angular.

To form the chamfer surfaces 26, 27, the distance P and radius R are determined relative to the gear module, m, of the bearing. As is known in the art, the gear module, m, of an annular bearing is equal to the ratio of the pitch diameter, d, to the number of gear teeth, n. A range of values for distance P and radius R is calculated as equal to or greater than 0.1 times the gear module, m, and less than or equal to 0.15 times the gear module, m. In other words, $0.1m \leq P \leq 0.15m;$ and $0.1m \leq R \leq 0.15m.$ Although various values for P and R may be selected from within the calculated range, in the preferred embodiment, the specific values of P and R are selected from within the calculated range so that optimal meshing of the bearing 10 and pinion 5 may be achieved. One method of selecting these values includes using ISO formulas.

Figure 6:
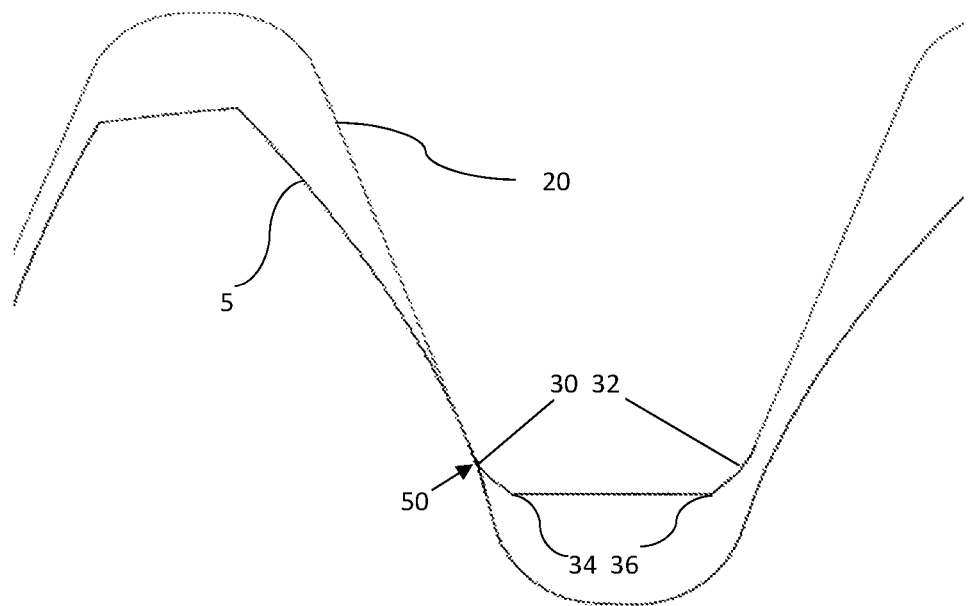
FIG. 6 depicts the interaction between the annular bearing in the preferred embodiment of the invention and a pinion.

As shown in FIG. 6, when gear teeth 20 are formed with the exemplary profile shown in FIGS. 3 and 4, the bearing 10 may mesh with the pinion 5 without causing damage to the pinion 5. More specifically, the use of the arc surfaces 30 with radius R and chamfered surfaces 26, 27 having a radial length P prevents damage to the pinion 5.

The bearing 10 and annular teeth 20 may be made entirely or partly of various materials such as metal, metallic compounds and/or alloys, plastics, natural and/or synthetic polymers, wood, ceramics, etc.

Figure 7:
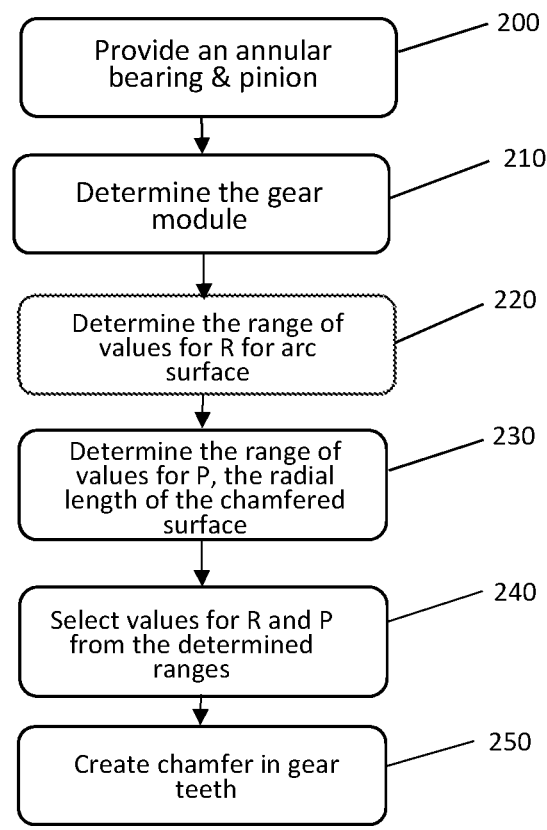
FIG. 7 is a flow chart of the steps of manufacturing an annular gear according to the preferred embodiment of this invention.

FIG. 7 depicts one embodiment of the method of manufacturing a bearing 10 according to this invention. Initially, an annular bearing 10, such as a slew bearing made of a metallic compound, having outwardly and substantially radially extending gear teeth 20 is provided in Step 200. A pinion 5 configured for use with the bearing 10 may also be provided in step 200. Next, in step 210, the gear module, m, of the bearing 10 is determined by measuring the pitch diameter, d, counting the number of gear teeth, n, and dividing the pitch diameter, d, by the number of gear teeth, n.

In step 220, the gear module, m, is used to calculate the acceptable range of values for the length of radius R of the arc surface 30 so that R is greater than or equal to 0.1m and R is less than or equal to 0.15m. The gear module, m, is also used in step 230 to calculate the acceptable range of values for the length of P so that P is greater than or equal to 0.1m and P is less than or equal to 0.15m.

In step 240, values for the lengths of R and P are selected from within the range of values calculated in steps 220 and 230. The specific values of R and P are selected so that optimal meshing of the bearing 10 with a pinion 5 may be achieved. ISO standards may be utilized in selecting the values of R and P.

In step 250, chamfered surfaces 26, 27 are created in the gear teeth 20 of the annular bearing 10 provided in step 200. This may be performed using various machining techniques such as grinding, milling, CNC, and deburring, etc. The chamfered surfaces 26, 27 are formed with an arc surface 30, 32 adjacent and contiguous with the side flank surface 28, and the side flank surfaces 28 are formed tangent to the arc surfaces 30, 32 so that a point of tangency 40 is formed. Additionally, the arc surface 30 is formed so that it has a radius R with the length selected in step 240.

Further, the chamfered surfaces 26, 27 are formed so that each surface has the length P, as determined in step 240, in the radial direction, as measured perpendicular to the outside line 42 and extending to the point of tangency 40. There may be a linear surface 49 between and contiguous with the arc surfaces 30, 32 and top land surface 38. Additionally, angular edges 34, 36 are formed where the linear surface 49 of the chamfered surface 26, 27 abuts the top land surface 38 and the chamfered surfaces extend at a 45-degree angle from the top land surface 38.

Alternatively, step 250 may include forming chamfered surfaces 26, 27, as shown in FIG. 5B, with a circular arc surface 30 contiguous with and extending between flank surface 28 and top land surface 38. In this embodiment, there may not be angular edges 34, 36 between the top land surface 38 and chamfered surfaces 26, 27.

Although the preferred embodiment of making the annular gear 10, as described above, involves machining the gear teeth 20 to make the necessary chamfered surfaces 26, 27. Other processes, such as molding, casting, extrusion and powder metallurgy, may be utilized to make the annular gear 10 with gear teeth 20.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing comprising:
   a bearing ring including an annular base and a gear module, m;
   a plurality of gear teeth connected to the annular base and the plurality of gear teeth positioned circumferentially around the annular base; and
   each gear tooth of the plurality of gear teeth including a first flank surface extending from the annular base, a top land surface spaced from the annular base, and a second surface extending between the top land surface and the first flank surface, the second surface including a first arc surface with a first radius $\geq 0.1$ m and $\leq 0.15$ m.

2. The bearing of claim 1, wherein the first flank surface is tangent to the first arc surface defining a point of tangency.

3. The bearing of claim 2, wherein a length P extends between the point of tangency and an outside line, which is coplanar with the top land surface, and the length P is $\geq 0.1$ m and $\leq 0.15$ m.

4. The bearing of claim 3, wherein the length P, as measured perpendicular to the outside line to the point of tangency, is $\geq 0.1$ m and $\leq 0.15$ m.

5. The bearing of claim 1, wherein each gear tooth of the plurality of gear teeth further comprises:
   an angular edge between the second surface and the top land surface; and
   the first arc surface of the second surface is contiguous with the first flank surface.

6. The bearing of claim 1, wherein each gear tooth of the plurality of gear teeth further comprises:

a third surface between the second surface and the top land surface, the third surface being substantially linear.

7. The bearing of claim 1, wherein each gear tooth of the plurality of gear teeth further comprises:
a second flank surface extending from the annular base and a fourth surface between the second flank surface and top land surface,
wherein the fourth surface includes a second arc with a second radius substantially equal to the first radius.

8. The bearing of claim 1, wherein the first flank surface extends in a substantially radial direction from the annular base and the top land surface extends in a substantially axial direction.

9. A gear tooth for a bearing including an annular ring with an annular base and a gear module, m, the gear tooth, comprising:
a first flank surface contiguous with the annular base and extending from the annular base;
a second surface contiguous with the first flank surface and extending from the first flank surface;
a first arc surface formed in the second surface and the first flank surface is tangent to the first arc surface at a point of tangency;
a top land surface contiguous with the second surface and extending from the second surface; and
a length P extending from the point of tangency to a line coplanar with the top land surface and the length P is ≥0.1 m and ≤0.15 m.

10. The bearing of claim 9, wherein the first arc surface has a first radius ≥0.1 m and ≤0.15 m.

11. The gear tooth of claim 9, wherein the top land surface and the second surface abut and form an angular edge.

12. The gear tooth of claim 9, wherein the length P, as measured perpendicular to the line coplanar with the top land surface to the point of tangency, is ≥0.1 m and ≤0.15 m.

13. The gear tooth of claim 9, further comprising:
a second flank surface extending from the annular bearing;
a third surface contiguous with the second first flank surface and the top land surface; and
a second arc surface formed in the third surface.

14. The gear tooth of claim 13, wherein the first arc surface has a first radius and the second arc surface has a second radius substantially equal to the first radius.

15. The gear tooth of claim 9, wherein the first flank surface extends substantially radially from the annular base and the top land surface extends substantially axially from the second surface.

* * * * *